US009860796B2

(12) United States Patent
Bostick et al.

(10) Patent No.: US 9,860,796 B2
(45) Date of Patent: Jan. 2, 2018

(54) SECURE WIFI USING PREDICTIVE ANALYTICS

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Ji Young Roe, Northbrook, IL (US); Kimberly G. Starks, Nashville, TN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/430,944

(22) Filed: Feb. 13, 2017

(65) Prior Publication Data
US 2017/0156087 A1    Jun. 1, 2017

Related U.S. Application Data

(63) Continuation of application No. 14/336,198, filed on Jul. 21, 2014, now Pat. No. 9,596,647.

(51) Int. Cl.
*H04W 48/00* (2009.01)
*H04W 36/00* (2009.01)
(Continued)

(52) U.S. Cl.
CPC ....... *H04W 36/0022* (2013.01); *H04W 28/18* (2013.01); *H04W 36/165* (2013.01);
(Continued)

(58) Field of Classification Search
CPC ..... H04W 48/17; H04W 36/26; H04W 88/06; H04L 12/2858
See application file for complete search history.

(56) References Cited

U.S. PATENT DOCUMENTS 8,514,717 B2    8/2013    Chow
9,374,775 B2    6/2016    Chhabra
(Continued)

FOREIGN PATENT DOCUMENTS

WO    WO2006101617 A2    9/2006

OTHER PUBLICATIONS

Arun Madan et al, Securely Adopting Mobile Technology Innovations for Your Enterprise Using IBM Security Solutions, Redguides for Business Leaders, IBM Corp., 2013, 42 pages.
(Continued)

*Primary Examiner* — Mounir Moutaouakil
(74) *Attorney, Agent, or Firm* — Patrick J. Daugherty; Driggs, Hogg, Daugherty & Del Zoppo Co., LPA

(57) ABSTRACT

Aspects automatically direct data requests from a specific application of a mobile programmable device to a designated WiFi network pathway without interaction from a mobile device user in response to determining that an initial data network pathway does not meet a satisfactory service threshold for forwarding the data requests to an event web server. Aspects also predict total attendance within a venue of the event and within a communication range of a designated WiFi service node by device users as function of real-time levels of social media following activity associated with the event and an available venue occupancy, a historical attendance at similar events within similar venues, and a time of the event. Aspects predicting a bandwidth requirement for usage of a WiFi pathway of the WiFi node for requests as a function of the predicted attendance.

14 Claims, 3 Drawing Sheets

(51) Int. Cl.
*H04W 36/26* (2009.01)
*H04W 36/16* (2009.01)
*H04W 28/18* (2009.01)
*H04W 88/06* (2009.01)
*H04W 84/12* (2009.01)

(52) U.S. Cl.
CPC ........... *H04W 36/26* (2013.01); *H04W 48/17* (2013.01); *H04W 84/12* (2013.01); *H04W 88/06* (2013.01)

(56) References Cited

U.S. PATENT DOCUMENTS

| | | | |
|---|---|---|---|
| 2003/0118015 A1* | 6/2003 | Gunnarsson | H04W 48/16 370/389 |
| 2006/0135150 A1* | 6/2006 | Oh | H04W 36/32 455/425 |
| 2006/0234725 A1* | 10/2006 | Litwin | H04W 48/08 455/456.2 |
| 2007/0060125 A1 | 3/2007 | Rahim | |
| 2008/0181187 A1 | 7/2008 | Scott | |
| 2009/0098857 A1 | 4/2009 | De Atley | |
| 2012/0270521 A1 | 10/2012 | Garcia et al. | |
| 2013/0285855 A1 | 10/2013 | Dupray et al. | |
| 2015/0032867 A1 | 1/2015 | Lihosit | |

OTHER PUBLICATIONS

Scott Andrews et al, Securing Your Mobile Business with IBM Worklight, Redbooks, IBM Corp., 2013, 180 pages.
U.S. Appl. No. 14/336,198, filed Jul. 21, 2014.
Notice of Allowance (dated Nov. 4, 2016) for U.S. Appl. No. 14/336,198, filed Jul. 21, 2014.

\* cited by examiner

SECURE WIFI USING PREDICTIVE ANALYTICS

BACKGROUND

Service providers tasked with providing wireless fidelity ("WiFi") services, and web page hosting services, associated with events with large numbers of attendees or remote viewers (via the internet and other network communication structures) face challenges in consistently responding to and sending content to and otherwise interacting in real time with guests, patrons and viewers.

Service providers may create specialized applications (or "apps") that operate on programmable mobile devices such as smart phones, tablets, etc. with specificity for such events. They may also modify standard web sites or specialized applications to convey interests related to the events. Media coverage may also place demands on service provider resource infrastructure, with large numbers of patrons and media personnel competing for the same (or shared) limited mobile, internet or WiFi bandwidth. High demands may overwhelm available systems, causing dropped and timed-out connections or otherwise interfering with connecting to such specialized applications, and thus with delivering satisfactory experiences for patrons.

BRIEF SUMMARY

In one aspect of the present invention, a method for automatically directing data requests from a specific application to a designated WiFi network pathway without interaction from a mobile device user includes determining whether an initial data network pathway meets a satisfactory service threshold for forwarding a first data request to an event web server that is associated with an assembly event. Said determination is in response to a first application that is executing on a processor of a mobile programmable device sending a first data request to the event web server via initial data network pathway, wherein the initial data network pathway is at least one of a cellular data network connection and a general WiFi pathway. In response to determining that the initial data network pathway does not meet the satisfactory service threshold, the method determines whether the programmable device is within communication range of a designated WiFi service node that is in communication with a first WiFi pathway that is designated for access by the first application for communications with the event web server. In response to determining that the programmable device is within the communication range of said designated WiFi service node, and to determining that the initial data network pathway does not meet the satisfactory service threshold, the mobile device processor automatically executes an authentication procedure with the WiFi service node to gain access to the first WiFi pathway without requiring a user of the mobile device to log in to the first WiFi pathway or to accept a connection to the first WiFi pathway, and uses the first WiFi pathway to send the first request to the event web server. Aspects also predict total attendance within a venue of the event and within a communication range of a designated WiFi service node by device users as function of real-time levels of social media following activity associated with the event and an available venue occupancy, a historical attendance at similar events within similar venues, and a time of the event. Aspects further predict a bandwidth requirement for usage of a WiFi pathway of the WiFi node for requests as a function of the predicted attendance.

In another aspect, a system has a processor on a mobile device, computer readable memory and a computer-readable storage medium with program instructions. The processor, when executing the stored program instructions, determines whether an initial data network pathway meets a satisfactory service threshold for forwarding a first data request to an event web server that is associated with an assembly event. Said determination is in response to a first application that is executing on a processor of a mobile programmable device sending a first data request to the event web server via initial data network pathway, wherein the initial data network pathway is at least one of a cellular data network connection and a general WiFi pathway. In response to determining that the initial data network pathway does not meet the satisfactory service threshold, the processor determines whether the programmable device is within communication range of a designated WiFi service node that is in communication with a first WiFi pathway that is designated for access by the first application for communications with the event web server. In response to determining that the programmable device is within the communication range of said designated WiFi service node, and to determining that the initial data network pathway does not meet the satisfactory service threshold, the mobile device processor automatically executes an authentication procedure with the WiFi service node to gain access to the first WiFi pathway without requiring a user of the mobile device to log in to the first WiFi pathway or to accept a connection to the first WiFi pathway, and uses the first WiFi pathway to send the first request to the event web server. Aspect processors also predict total attendance within a venue of the event and within a communication range of a designated WiFi service node by device users as function of real-time levels of social media following activity associated with the event and an available venue occupancy, a historical attendance at similar events within similar venues, and a time of the event. Aspect processors further predict a bandwidth requirement for usage of a WiFi pathway of the WiFi node for requests as a function of the predicted attendance.

In another aspect, a computer program product has a computer-readable storage medium with computer readable program code embodied therewith. The computer readable program code comprises instructions that, when executed by a computer processor, cause the computer processor to determine whether an initial data network pathway meets a satisfactory service threshold for forwarding a first data request to an event web server that is associated with an assembly event. Said determination is in response to a first application that is executing on a processor of a mobile programmable device sending a first data request to the event web server via an initial data network pathway, wherein the initial data network pathway is at least one of a cellular data network connection and a general WiFi pathway. In response to determining that the initial data network pathway does not meet the satisfactory service threshold, the processor is caused to determine whether the programmable device is within communication range of a designated WiFi service node that is in communication with a first WiFi pathway that is designated for access by the first application for communications with the event web server. In response to determining that the programmable device is within the communication range of said designated WiFi service node, and to determining that the initial data network pathway does not meet the satisfactory service threshold, the mobile device processor is caused to automatically execute an authentication procedure with the WiFi service node to gain access to the first WiFi pathway without requiring a user of the mobile device to log in to the first WiFi pathway or to accept a connection to the first WiFi pathway, and to use the first WiFi pathway to send the first request to the event web server. In some aspects, the processor is also caused to predict total attendance within a venue of the event and within a communication range of a designated WiFi service node by device users as function of real-time levels of social media following activity associated with the event and an available venue occupancy, a historical attendance at similar events within similar venues, and a time of the event. In some aspects, the processor is also caused to predict a bandwidth requirement for usage of a WiFi pathway of the WiFi node for requests as a function of the predicted attendance.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

Figure 1:
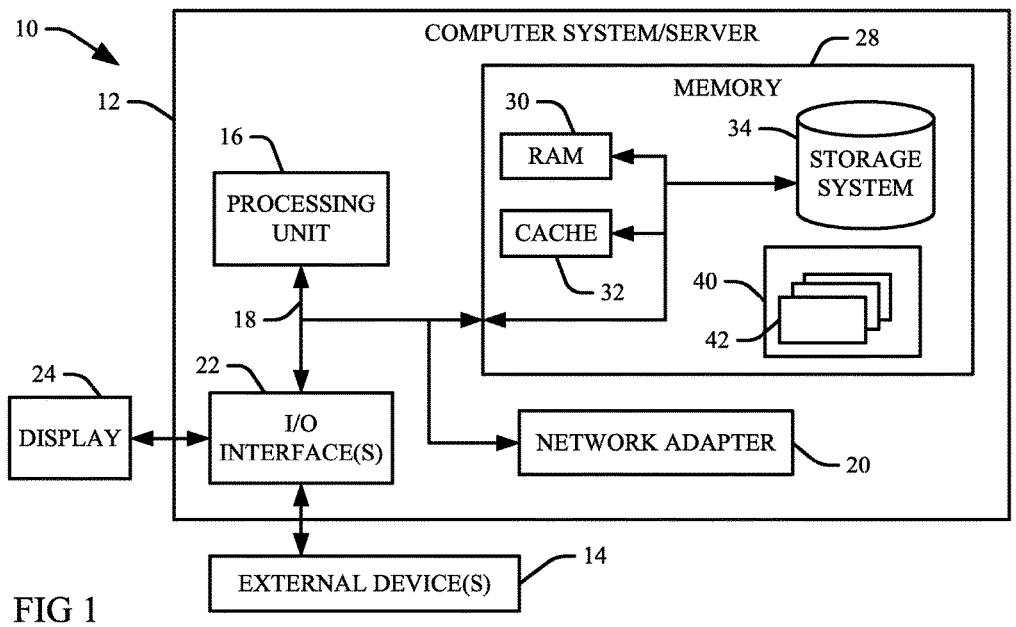
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of a non-limiting example, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
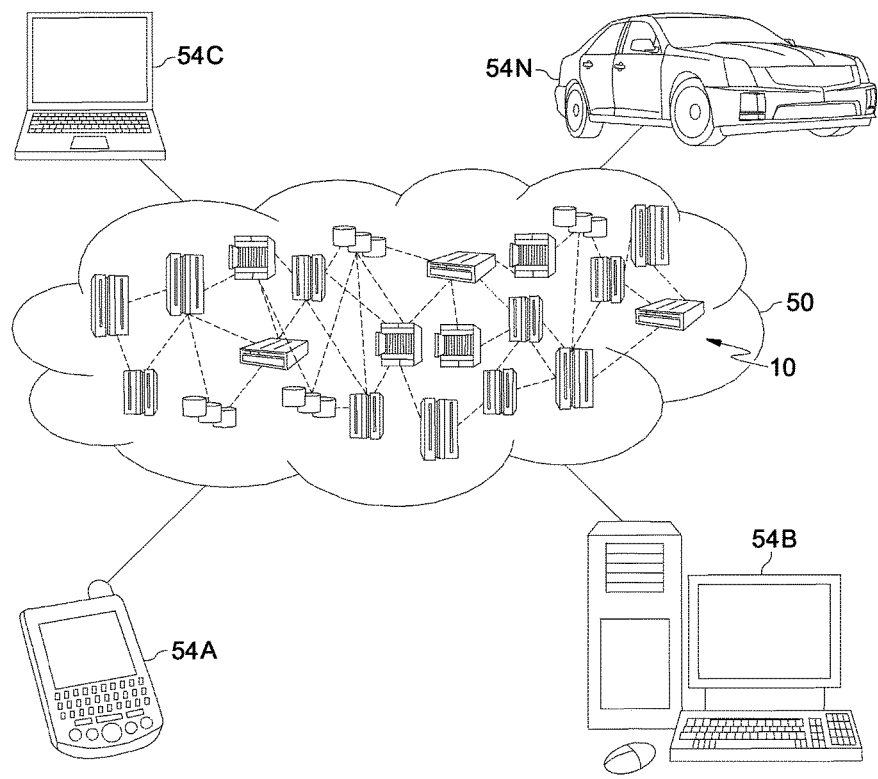
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
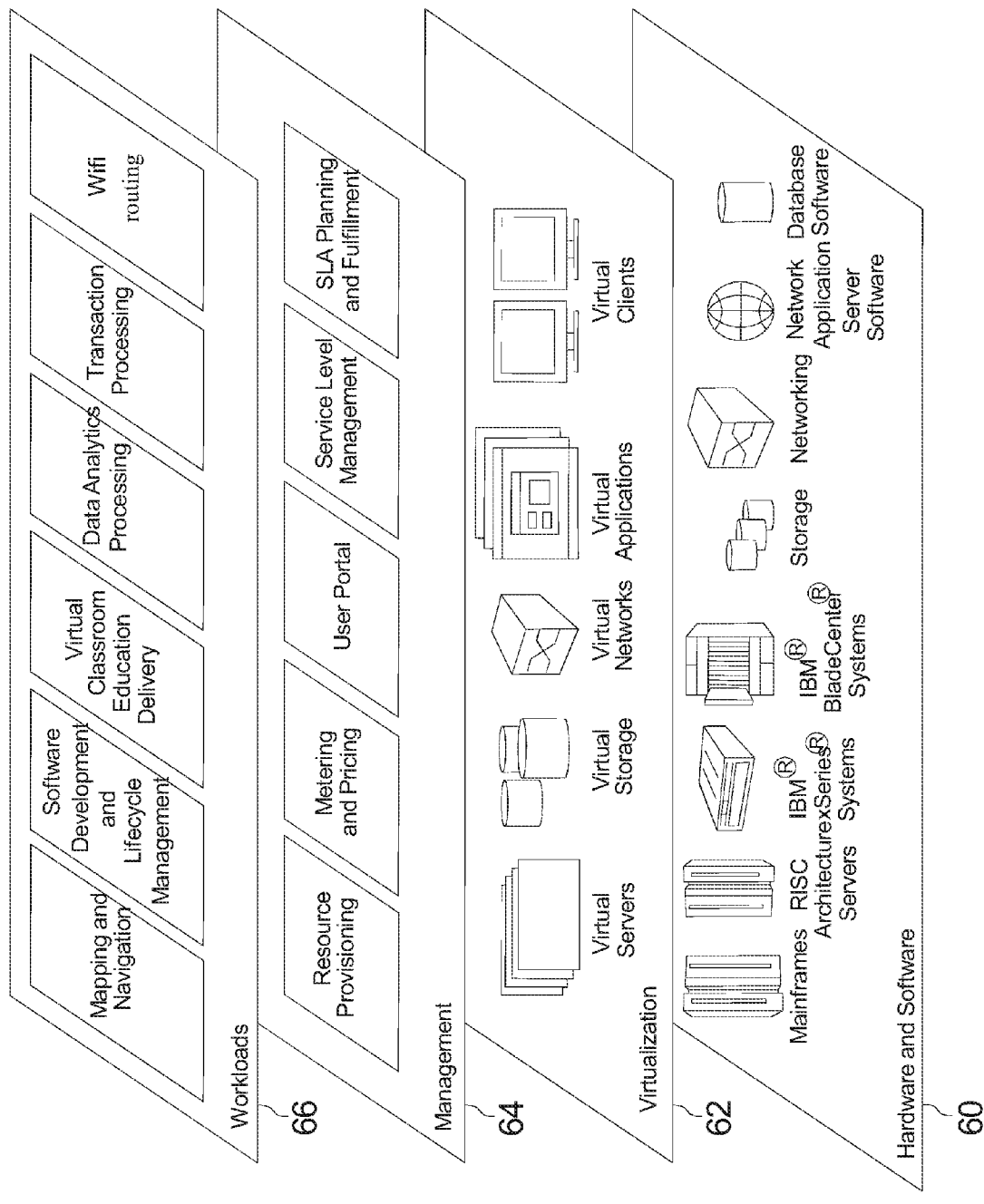
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and or WiFi routing, including automatically redirecting specific application data requests and communications to a designated WiFi network pathway without interaction from a mobile device user, or determining WiFi network bandwidth needed in support of WiFi pathway service at an event, according to aspects of the present invention (as described more particularly below).

In one aspect, a service provider may perform process steps of the invention on a subscription, advertising, and/or fee basis. That is, a service provider could offer to integrate computer readable program code into the computer system/server 12 to enable the computer system/server 12 to perform process steps of the invention. The service provider can create, maintain, and support, etc., a computer infrastructure, such as the computer system 12, bus 18, or parts thereof, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 12, from a tangible computer readable medium device 34; (2) adding one or more computing devices to the computer infrastructure 10; and (3) incorporating and/or modifying one or more existing systems 12 of the computer infrastructure 10 to enable the computer infrastructure 10 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Service providers producing or servicing large public assembly events (for example, sporting events, entertainment or music productions, speeches, etc.) desire the capacity and flexibility to send content and interact in real time with guests and patrons of events. Many providers create specialized applications (sometimes referred to as "apps") specifically for such events that enable the delivery of products and services to patrons, for example functioning as web browsers that provide connections to a dedicated web site associated with an event (an "event web site"). Event web sites may comprehend sets of related web pages served from a web domain and hosted on at least one web server ("event web server"), a remote computer that is accessible via one or more network connection pathways. Service providers may also modify standard web sites or applications or event web servers associated therewith to provide event platforms that convey interests and execute financial transactions related to the events with patron and customers.

Event web servers may also have to service data requests and other web site traffic from media and other non-patron requestors. Accordingly, patrons using mobile programmable devices (for example, cellular phones, tablet devices, laptop computers, etc.) to send data communications to event web servers via event web sites and specialized event applications are competing for available bandwidth with the media and each other. Provider applications and event web sites may time out or otherwise cause a failure to satisfy a patron request in instances of large volumes of requests to web event servers that tax or overwhelm available bandwidth. Aspects of the present invention provide systems and methods to improve satisfaction of patron requests by available network infrastructure and thereby allow patrons to get the information and interactive capabilities that they desire as well as what the event deems important for its customers.

WiFi and other data communication service providers for assembly events need to consider support for both the number of connections and bandwidth (data speed). Two common network access methods used by mobile device users are cellular and WiFi networks. Cellular services are typically provided by telecommunications companies or other service providers, and depending on the cellular service provider and specific mobile device there is a range of bandwidth possible within a given area of coverage. Cellular customers are typically charged for data usage as a monthly flat rate or by increments of data used (for example, megabytes (MB) or gigabytes (GB)). If a mobile application is data intensive over a given period of time (for example, days or weeks in the case of multi-day events such as golf or tennis tournaments of play-offs stretching over different game days), it is desirable to consider the cost of data for the users to patronize the service provider applications and web pages and offer the alternative use of WiFi to make customer participation more cost effective.

WiFi is a wireless technology that offers a standard interface and connection protocol that is accessible and usable by a wide variety of different smart phones and mobile devices. WiFi network service is generally short-range and limited to devices within a threshold physical proximity to WiFi access points, or communication nodes. Thus, WiFi networks may be intentionally designed to be limited to the geographic boundary of an event venue. For example, a WiFi pathway via a WiFi access point may only be accessible while within an arena, or within a sub-set area within the arena (such as a premium seating stand, a loge, a restaurant seating area, etc.), wherein the WiFi signals are not strong enough outside of the arena or sub-set area to effect connection and communication.

Figure 4:
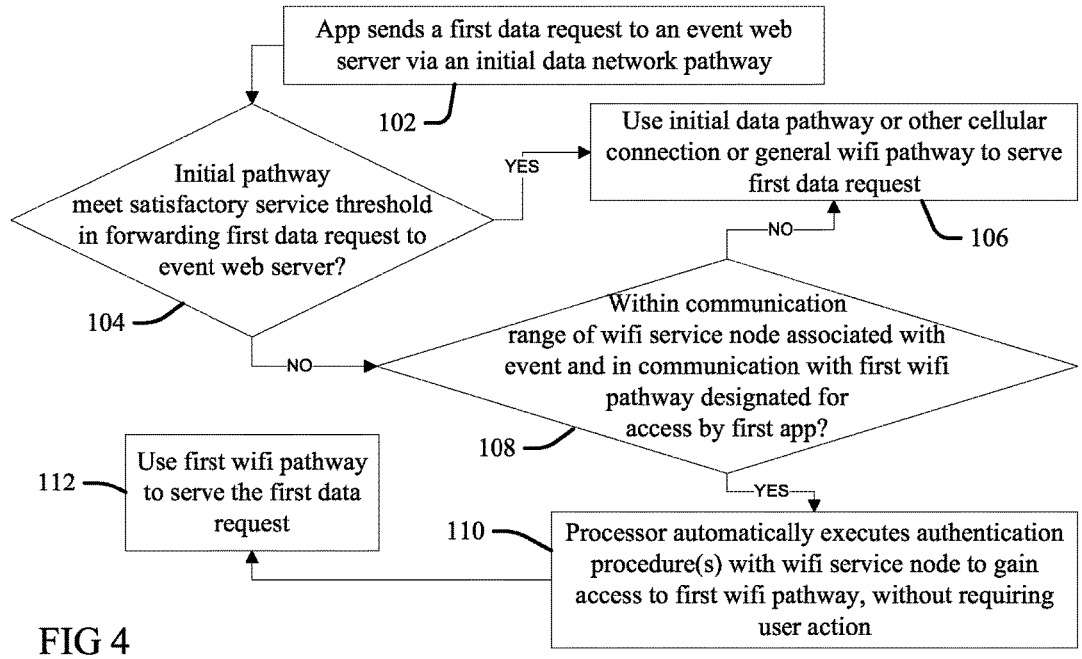
FIG. 4 is a flow chart illustration of a method or process aspect according to the present invention for automatically directing specific application data requests and communications to a designated WiFi network pathway without interaction from a mobile device user.

FIG. 4 illustrates a method or process aspect according to the present invention for automatically directing specific application data requests and communications to a designated WiFi network pathway without interaction from a mobile device user, but instead based on the user's use of a preferred application (or "app"). At 102 a processor executing instructions according to the present invention and running on a programmable device (for example, smart phone, tablet, personal computer, laptop, etc.) uses a first application to send a first data request to an event web server via an initial data network pathway (for example, a cellular data network connection or a general, public, or open-access WiFi pathway currently accessed by the processor through a WiFi service node). The event web server services an event web site that provides services to patrons and other users that associated with the event, for example providing live updates of scores or players participating in a sporting event, video or other web page content for pre-authorized or sponsoring entities selected by an event service provider, etc.

At 104 the processor determines whether the initial data network pathway meets a threshold for satisfactory service in forwarding the first data request to the event web server, and thus whether a the presently-used cellular data network connection or general WiFi pathway is able (or appropriate) to satisfactorily forward or otherwise serve the first data request to the event web server. For example, the processor determines whether the network node of the cellular data connection or general WiFi pathway is able to meet a threshold minimum time for service in timely responding to or otherwise satisfactorily handling each of a large plurality of pending or incoming requests that includes the first request, or if instead bandwidth congestion result in an unacceptably long wait (in excess of a time threshold) for a response to the first request, which may entail a failure to send or receive the request or a response thereto due to a connection time-out. In some aspects, the determination at 104 applies a class of service threshold to determine whether the first request is of a first class of request that indicates or requires priority handling over other, lower classifications of the other requests, and hence that the connection does not meet the satisfaction threshold and therefore the first request should be routed to a different, priority or higher service pathway relative to the currently accessed cellular connection or general WiFi pathway option. Still other threshold criteria and related satisfaction determinations at 104 will be apparent to one skilled in the art.

If at 104 the processor determines that the initial data network pathway meets the satisfactory service threshold for forwarding the first data request to the event web server, then said initial data network pathway is used at 106; else, at 108 the processor determines whether the programmable device is within range of a WiFi service node that is associated with the event and in communication with a first WiFi pathway that is designated for access by the first application for communications with the event web server.

If determined at 108 that the programmable device is within range of said designated WiFi service node (for example, it is proximate enough to the node so that WiFi communications may be established), at 110 the processor automatically executes one or more authentication procedures with the WiFi service node (as a function of or via the first application) to gain access to the first WiFi pathway, without requiring any user action (such as logging in to the first WiFi pathway, or accepting a connection to the first WiFi pathway, etc.). In some applications, secure or priority first WiFi service access route pathways are web server access pathways that are local to a geographic area defined for the event, available via a local network and configured for on premise communication only. Thus, when determined that a mobile user's carrier network or general WiFi pathway options provided by the initial data network pathway are not available or satisfactory at 104, the first application may automatically fail over to the secure network, priority first WiFi pathway via the process at 108/110/112 without requiring active steps or intervention from the user. In executing the preferred (first) application, the mobile device performs necessary tasks automatically, wherein communications and authorizations can occur entirely in the background, without any knowledge of the user or requiring the user to log-on to the first WiFi pathway, or confirm and accept a connection to the local WiFi or near field communication network providing the pathway.

At 112 the processor uses the first pathway to send the first request or otherwise communicate with the event web server. Alternatively, if the first pathway is not made available to the application request (for example, via a determination that the request is of low value or priority and does not meet a threshold request classification, the request is not directed to the event web server, etc.) then the request may be handled by the initial data network pathway or other cellular network node or general WiFi pathway.

The first WiFi pathway, and any other WiFi network routes designated for use by the first application, may be generally reserved for any data requests from the first application, and optionally other, similarly favored and specified applications, applications or websites, wherein access is limited with respect to other sources in order to ensure that WiFi node bandwidth can adequately serve all such favored requests. In some examples, designated access is determined at 108 in response to recognizing that the first request comes through a specified web-based application platform interface (API) that is designated for enhanced connections to data dispensed by a venue associated with the event web server. Such designated pathways may provide higher security, throughput and/or priority WiFi service access routes to the event web server, relative to other cellular or WiFi pathways to the event web server.

Determination as to satisfactory service by the cellular connection or general WiFi pathway at 104, or by the designated first pathway at 108, may also entail identifying the first request as a high value or high priority request, as distinguished from other, non-high value/priority requests, in order to ensure that only high priority or value requests may use the preferred (perhaps higher bandwidth) first WiFi pathway at 108/110/112. Such a determination may be independent of determining any network congestion or delay, etc., conditions at 104. For example, if a user sending a high value first request, such as a purchase or other financial transaction that directly or indirectly generates revenue for an event service provider, goes back to casual browsing and sends a second, low value/priority request (such as a general search query not related to the event or from the first application), the second request may instead be routed at 108 to the cellular data pathway or to another, general WiFi pathway for communication at 106. Aspects may base service adequacy determinations at 104 or WiFi pathway selection at 108 on user or application status or class, for example, users may pay higher subscriber fees or premium application purchase prices relative to standard pricing, in order to have guaranteed service, perhaps to enable selection of private WiFi pathways at 110/112, rather than public, free or other lower cost (and lower service) WiFi pathways at 106.

Service providers should also consider the bandwidth needs of the WiFi network in order to satisfy their venue customers, for example providing capacity to support an expected number of simultaneous WiFi connections established by customer devices within the geographic coverage of the WiFi network across an event venue. Providers may also strive to ensure that customers can access other applications that are beyond the scope of the local WiFi, via robust connectivity bandwidth to internet or secure intranet or other network resources.

High local demand for data communications within a venue may result in over commitment to the network for the numbers of attending patrons and media. Increasing networking bandwidth may provide a solution, but this may come at a high cost to a provider business. Alternatively, according to the present invention, service providers may instead solve oversubscription conflicts by divvying up available WiFi network bandwidth into separate, distinguished WiFi pathways and ensure that the higher value patrons or customers are directed to the more-robust preferred (first) WiFi network pathways. The provider may differentially scale each of the different pathway resources, in some examples as appropriate for desired business segments. Scaling may also be specific to network solutions based on the type of request, for example scaling up a first pathway designated to handle financial transaction data packets more robustly than a second pathway designated for general information request data packet communications.

Aspects of the present invention use local WiFi nodes within event venues to ensure robust data packet communications via the preferred, secure first WiFi pathways in order to avoid customer dissatisfaction that would otherwise be caused by dropped cellular data packets. Service providers may provide users attending an assembly event within an arena, stadium, park or other defined geographic space covered by WiFi nodes with applications that allow the users to use their mobile devices to access the special, designated first WiFi pathways via the WiFi nodes.

In the prior art, event applications may fail to satisfactorily send and receive data packets when using standard, available cellular data and event WiFi networks due to oversubscription of limited resources. For example, popular sporting events may attract heavy, competing usage of available cellular data and local WiFi networks by members of the media or other non-customer users. Such other usage may cause interference with customer data usage, sometimes to the point of preventing communications with event web servers by the customer users. In contrast, aspects of the present invention ensure that certain designated (first) WiFi pathways are available at the event location that are reserved only for customers using certain designated applications provided or recognized by the event sponsor or other service provider, thereby ensuring satisfactory communications with such users and preventing other users from access to (and oversubscription of) the resources designated to the special pathways. If detection of fail over to such secure WiFi pathways is automatic and available to designated applications only, there is no need for patrons to set up the fail over, increasing convenience and customer satisfaction. Aspects may thus enable timely communications with event web servers, maintaining real-time transaction communications where time is of the essence, for example ensuring that users get communication packets sent and received prior to the closing of time-limited windows of opportunity for communication at events that offer time-limited special discount opportunities for their clients.

A preferred (first) application according to the present invention may enable processors to recognize and understand high value requests appropriate for the designated WiFi connections and raise the request priority to qualify for the favored, higher bandwidth WiFi pathway or directly send the request through said pathway. Once the processor recognizes that the user has gone back to casual browsing, for example via use of a different application, or by sending a low-value general query through the first application, said subsequent requests are instead routed back to general or public WiFi or a different highway connection.

Generally, the favored, preferred (first) access pathways and services available via a provider network are created for on-premise communication only. When a mobile user's carrier network or usual, generally available WiFi pathway is not available or satisfactory for receiving requests from the first application, then the application fails over to the secure network without intervention from the user, the user does not have to connect to a specific WiFi connection or near field communication network to obtain this data.

Aspects of the present invention also use predictive analytics approaches to determine the number of WiFi connections needed, their respective locations within a venue, and/or their respective bandwidth (data speed) capability requirements, in order to provide satisfactory service for anticipated volumes and/or amounts of the preferred ("first") data requests routed to the preferred (first) WiFi access pathways according to the aspects illustrated in FIG. 4 and discussed above. Network service provided by WiFi connections is limited to programmable devices physically located within broadcast range and connecting to said connections. Aspects project anticipated numbers or volumes of simultaneous connections to the WiFi connections by the first applications for preferred (first) data request traffic that is likely to be generated by patrons attending the event and within said broadcast range(s), and use these projections to locate and configure WiFi nodes about the venue associated with the event.

Figure 5:
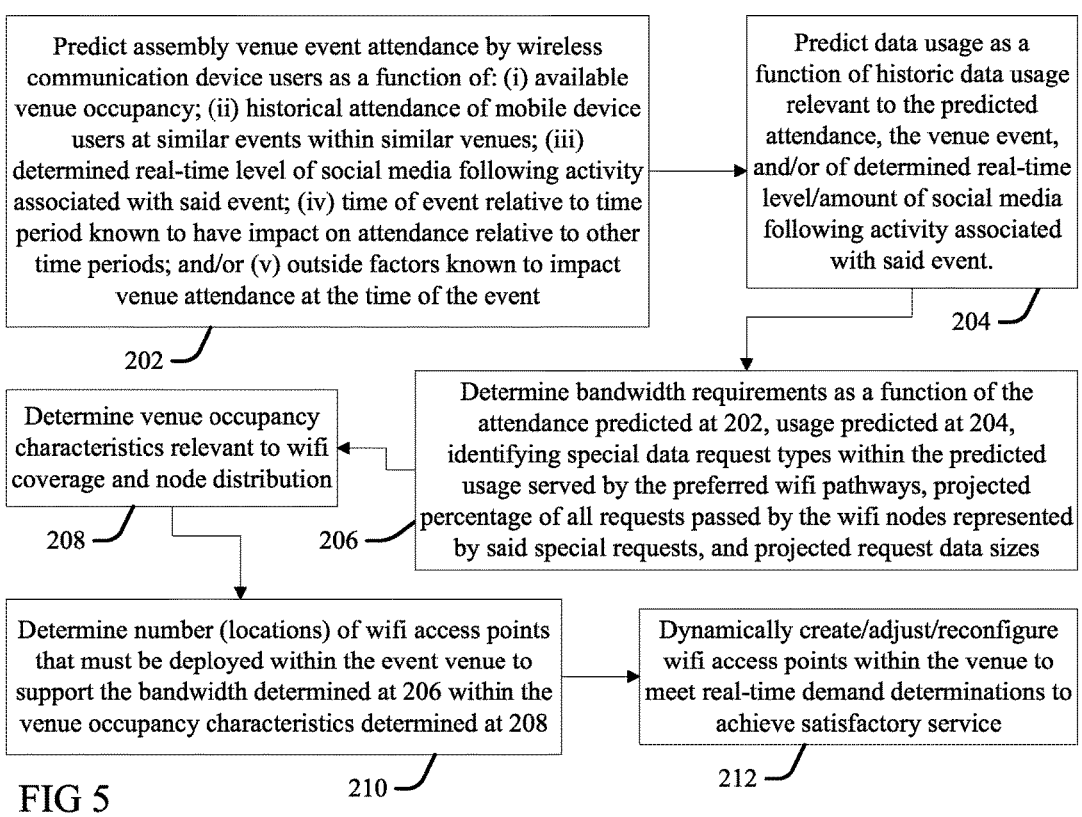
FIG. 5 is a flow chart illustration of a method or process aspect according to the present invention that predicts WiFi network bandwidth and zones needed in support of preferred WiFi pathway service at an event as a function of a variety of input data.

FIG. 5 illustrates one aspect of the present invention that provides predictive analytics approaches to determine the WiFi network bandwidth and zones needed in support of preferred WiFi pathway service to preferred applications at an event according to the present invention as a function of a variety of input data. At 202 a processor executing instructions according to the present invention predicts total attendance by wireless communication device users of an assembly venue for an event, the predicting a function of one more inputs, including: (i) available venue occupancy; (ii) historical attendance of mobile device users at similar events within similar venues; (iii) determined level of social media following activity associated with said event; (iv) time of event relative to time of day, day of week or season or of any other useful time period known to have impact on attendance relative to other times; and/or (v) outside factors known to impact venue attendance at the time of the event.

The "(i) available venue occupancy" input considered at 202 is generally determined by input of total approved occupancy of the venue by licensing authorities, for example, the occupant load allowed based on all available seating taken, along with any areas approved for standing occupancy, or based on occupancy allowed per total square foot dimensions of assembly areas of venue as defined by fire or life safety codes. If the event is limited to only portions of the venue, such as a first round tennis match taking place in a peripheral court within a large venue, then the "(i) available venue occupancy" may be occupancy of the stands about that court, rather than all stands within a larger, encompassing venue.

The "(ii) historical attendance of mobile device users for similar events within similar venues" input recognizes that some event types have different occupancy loads, and relative percentage of mobile device users, relative to other events. For example, first round, semi-final or final matches in a tournament may tend to have progressively higher attendance levels relative to each other. A concert hall venue hosting a rock music concert event may have a similar occupancy as a classical music event, but have a much higher percentage of users that actively use the first application or other applications on mobile devices during the event.

The "(iii) determined real-time level of social media following activity associated with said event" input is a determination of a level or amount of social media following activity associated with the event. The level or amount determinations may include determining a number of followers of event participants observed on social media platforms, for example, Facebook®, Twitter®, and other social media platforms, and extrapolating a predicted number of attendees from the level or amount determinations. (FACEBOOK is a trademark of Facebook, Inc. in the United States, other countries, or both; TWITTER is a trademark of Twitter, Inc. in the United States, other countries, or both.) Follower interest in key match ups with other event participants may also be distinguished between events, for example recognizing that an upcoming semi-final tennis match including Rafael Nadal and Roger Federer is generating more social media followers than similar event matches (for example, semi-finals for this same tournament during previous years, or semi-finals at other, similar tournaments, etc.) that feature less popular participants, and the relative differences in social media activity may be extrapolated (in a linear, logarithmic or other relationship) to predict a corresponding projected increase of attendance at the upcoming event.

By continually monitoring amounts and levels of social media activity in real-time, aspects of the present inventions may quickly respond to last-minute upward trends and identify sudden and otherwise unforeseen increases in interest that lead directly to increasing projected attendance levels. Thus, on-location, real-time monitoring of social activity levels and amounts during an event occurring at a venue may recognize a spike in activity that indicates that a flash crowd or other sudden increase in attendance is highly likely at an upcoming event (such as a next tennis match, or next musical performance by a group suddenly generating lots of activity).

The "(iv) time of event relative to time period known to have impact on attendance" input recognizes the social and business context of the event. Thus, a baseball game occurring during an afternoon during a weekday may typically have an attendance that is less than one at night, at night on a weekend, or during a weekend afternoon. Events may also be impacted by a regional school calendar, with events typically attended by school age children showing increases in attendance after large numbers of regional school systems end classes for the summer. Observed attendance increases may also differ based on relative month or region, for example showing historically larger upticks in warmer summer months in northern areas having colder winters relative to spring and fall months, or in early season months for teams that historically miss playoffs and have corresponding drop-offs in interest and attendance in late season.

The "(v) outside factors known to impact venue attendance at the time of the event" input recognize factors that are independent of the event itself. For example, a short-term weather forecast may indicate storms, unseasonable cold weather, unseasonably hot weather, etc., that is known to decrease or increase attendance at similar events for this venue or other comparable venue. Sunny, pleasant weather in some regions with beaches or other competing outdoor activity attractions may historically decrease attendance at similar events or venues, while storms or other weather conditions may correspondingly increase attendance. Competing assembly events occurring simultaneously, or traffic problems due to road or mass transit construction disruptions, may also reduce attendance, while alleviation or absence of the same may indicate a predicted increase in attendance.

At 204 the processor predicts data usage as a function of historic data usage relevant to the attendance projected at 202, the venue event, and/or of the determined real-time level or amount of social media activity. The historic data usage for the predicted attendance considered at 204 may be projected or extrapolated from an observed rate, number of transactions or bandwidth consumed for a previous event relevant to the present, upcoming event.

At 206 the processor calculates bandwidth requirements as a function of the attendance predicted at 202, the usage predicted thereof at 204, and/or by identifying special data request types within the predicted usage that should be served by the preferred WiFi pathways. The bandwidth requirements may be determined as a function of projected percentages of favored requests relative to all requests passed by the WiFi nodes, and their projected data sizes. Knowing the size of the data being transmitted for each request type and total number of patrons for the event sending the requests leads to calculation of bandwidth requirements for the specialized pathways, as well as all WiFi pathways taken in aggregate.

In some aspects, the processor at 206 determines if all or only specified requests from the first application are granted access to the preferred and/or secure pathways (in contrast to other requests from other applications), or are they limited to only certain types of requests (financial related, etc.). Once requests are identified for granted access to the preferred pathways, the projected proportion of such requests and their projected sizes can be determined from historical event data and/or of social media following activity. For example, if determined or projected that 20% of all requests from the first application are financial related transactions that should be given access to the preferred pathways, and the data sizes of such financial related transactions are known from historic data, then the bandwidth support required for each WiFi node to support the financial request bandwidth requirements on the preferred pathway may be determined.

At 208 the processor determines venue occupancy characteristics relevant to WiFi coverage and node distribution. This calculation takes into account the physical size and layout of the venue, to understand and determine appropriate locations for placement of multiple WiFi access points. Said placement or deployment generally specifies distances between the different access points to provide non-overlapping communication ranges that in aggregate span the geographic space of a venue that is larger than the communication range of a single WiFi service node. Thus, each WiFi service node is one of a plurality of WiFi service nodes that are deployed within the venue geographic space and spaced in an arrangement that in aggregate will provide comprehensive WiFi coverage for the venue.

This determination may be a function of seating projections by sub-venue, for example, identifying stands about specific tennis courts having a first round match event that is within a large venue that has multiple, other courts; or which sections of seating in a stadium or arena will be occupied if some are closed off, as projected from occupancy by ticket sales, or by the total attendance by wireless communication device users predicted in step 202.

At 210 the processor determines the number (and in some aspects, locations) of WiFi access points that must be deployed within the event venue to support the bandwidth determined at 206 within the venue occupancy characteristics determined at 208. The processor generally calculates the number of WiFi access points at 210 as a function of available numbers of supported WiFi connections per access point. Given the space and dimensions of the venue as determined at 208, the processor calculates how many WiFi access points and connections will be supported based on the number of patrons of the occupancy projected at 202 and the number of secure WiFi requests and estimates in number of transactions per minute determined at 206 and 204.

At 212 additional WiFi access points are dynamically created, activated, deployed (or some are taken off line, shutdown, throttled back, etc.) to meet real-time WiFi bandwidth demand determinations and thereby ensure (achieve) satisfactory service. The real-time demand determinations may indicate that the WiFi nodes as deployed and configured at 210 are not handling the actual amount of wireless activity taking place at the event, for example due to a flash crowd or other sudden increase in the attendance predicted at 202, the data usage predicted at 204, or the bandwidth requirements predicted at 206. Thus, WiFi nodes strategically located and having additional capacity may have additional WiFi pathway support activated or be otherwise reconfigured to provide satisfactory service coverage within the event venue, or nodes may be physically moved about as needed. For example, the WiFi nodes located to span courts no longer used at the end of one tennis match may be disabled, correspondingly reducing demands on overall bandwidth service that is now available to service other areas of the venue. Additional nodes with communications ranges overlapping current coverage may also be deployed about another area (court) showing a sudden, real-time surge in attendee social media activity.

Applications accessing preferred WiFi pathways according to the present invention may be on the premises of the actual event, or within an off-site location, such as a venue in another city providing closed-circuit video feeds for patrons. Depending on the type of application requests from users, the application service provider may determine and deploy different thresholds for access to the preferred WiFi pathways and associated secure bandwidth, as a function of capacity requirements specified from the predictive analytics, and in serving the objective of reserving bandwidth for the most important type of requests or transactions (for example, financial related).

What is claimed is:

1. A computer-implemented method for determining WiFi network bandwidth needed in support of WiFi pathway service at an event, the method comprising executing on a processor:
   predicting a total attendance within a venue of the event and within a communication range of a designated WiFi service node by users of mobile programmable devices that are each operating a first application, wherein the predicting is a function of a determined real-time level of social media following activity associated with said event and an input that is selected from the group consisting of an available occupancy of the venue, a historical attendance of the users of the units of the mobile programmable device at similar events within similar venues, and a relation of a time of the event to a time period known to have an impact on event attendance relative to other times;
   predicting data usage of the units of the mobile programmable device of the predicted attendance as a function of historic data usage relevant to the predicted attendance, of historic data usage relevant to the venue for the event, and of the determined real-time level of social media following activity associated with said event;
   predicting a bandwidth requirement for usage of a first WiFi pathway of the designated WiFi node for a plurality of requests by the units of the mobile programmable device as a function of the predicted attendance, of the predicted data usage of the units of the mobile programmable device of the predicted attendance, and of projected data sizes of the requests; and
   dynamically adjusting bandwidth of the first WiFi pathway as a function of the predicted bandwidth requirement.

2. The method of claim 1, further comprising:
   integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the predicting the total attendance, the predicting the data usage of the units of the mobile programmable device of the predicted attendance, the predicting the bandwidth requirement, and the dynamically adjusting the bandwidth of the first WiFi pathway.

3. The method of claim 2, wherein the computer-readable program code is provided as a service in a cloud environment.

4. The method of claim 1, wherein the venue spans a geographic space that is larger than the communication range of the designated WiFi service node, and the designated WiFi service node is one of a plurality of WiFi service nodes that are deployed within the venue geographic space and spaced to provide non-overlapping communication ranges that in aggregate provide comprehensive WiFi coverage of the venue, the method further comprising:

dynamically deploying, to meet a real-time determination of an increase in demand for bandwidth for the first WiFi pathway above the predicted bandwidth requirement for usage of the first WiFi pathway of the WiFi node for the plurality of the requests by the units of the mobile programmable device as a function of the predicted attendance and as a function of the determined real-time level of social media following activity associated with said event, an additional item that is selected from the group consisting of an additional first WiFi pathway by the WiFi node providing the first WiFi pathway, and an additional WiFi node.

5. The method of claim 4, further comprising:
determining the real-time determination of the increase in demand for the bandwidth for the first WiFi pathway above the predicted bandwidth requirement for usage of the first WiFi pathway of the designated WiFi node as a function of a projected percentage of favored requests relative to all requests passed by designated WiFi node, and the projected data sizes of the favored requests.

6. The method of claim 4, further comprising:
determining the relation of the time of the event to the time period known to have the impact on event attendance as whether the time of the event is within the time period known to have the impact on event attendance; and wherein the time period known to have the impact on event attendance is selected from the group consisting of a business day, a school calendar, and an annual season.

7. A system, comprising:
a processor;
a computer readable memory in circuit communication with the processor; and
a computer-readable storage medium in circuit communication with the processor and the computer readable memory;

wherein the processor, when executing program instructions stored on the computer readable storage medium via the computer readable memory:

predicts a total attendance within a venue of an event and within a communication range of a designated WiFi service node by users of mobile programmable devices that are each operating a first application, wherein the predicting is a function of a determined real-time level of social media following activity associated with said event and an input that is selected from the group consisting of an available occupancy of the venue, a historical attendance of the users of the units of the mobile programmable device at similar events within similar venues, and a relation of a time of the event to a time period known to have an impact on event attendance relative to other times;

predicts data usage of the units of the mobile programmable device of the predicted attendance as a function of historic data usage relevant to the predicted attendance, historic data usage relevant to the venue for the event, and of the determined real-time level of social media following activity associated with said event;

predicts a bandwidth requirement for usage of a first WiFi pathway of the designated WiFi node for a plurality of requests by the units of the mobile programmable device as a function of the predicted attendance, of the predicted data usage of the units of the mobile programmable device of the predicted attendance, and of projected data sizes of the requests; and dynamically adjusts bandwidth of the first WiFi pathway as a function of the predicted bandwidth requirement.

8. The system of claim 7, wherein the venue spans a geographic space that is larger than the communication range of the designated WiFi service node, and the designated WiFi service node is one of a plurality of WiFi service nodes that are deployed within the venue geographic space and spaced to provide non-overlapping communication ranges that in aggregate provide comprehensive WiFi coverage of the venue; and wherein the processor executes the program instructions stored on the computer-readable storage medium via the computer readable memory and thereby dynamically deploys, to meet a real-time determination of an increase in demand for bandwidth for the first WiFi pathway above the predicted bandwidth requirement for usage of the first WiFi pathway of the WiFi node for the plurality of the requests by the units of the mobile programmable device as a function of the predicted attendance and as a function of the determined real-time level of social media following activity associated with said event, an additional item that is selected from the group consisting of an additional first WiFi pathway by the WiFi node providing the first WiFi pathway, and an additional WiFi node.

9. The system of claim 8, wherein the processor executes the program instructions stored on the computer-readable storage medium via the computer readable memory and thereby determines the real-time determination of the increase in demand for the bandwidth for the first WiFi pathway above the predicted bandwidth requirement for usage of the first WiFi pathway of the designated WiFi node as a function of a projected percentage of favored requests relative to all requests passed by designated WiFi node, and the projected data sizes of the favored requests.

10. The system of claim 8, wherein the processor executes the program instructions stored on the computer-readable storage medium via the computer readable memory and thereby further determines the relation of the time of the event to the time period known to have the impact on event attendance as whether the time of the event is within the time period known to have the impact on event attendance; and wherein the time period known to have the impact on event attendance is selected from the group consisting of a business day, a school calendar, and an annual season.

11. A computer program product for determining WiFi network bandwidth needed in support of WiFi pathway service at an event, the computer program product comprising:
   a computer readable hardware storage device having computer readable program code embodied therewith, the computer readable program code comprising instructions that, when executed by a computer processor, cause the computer processor to:
   predict a total attendance within a venue of an event and within a communication range of a designated WiFi service node by users of mobile programmable devices that are each operating a first application, wherein the predicting is a function of a determined real-time level of social media following activity associated with said event and an input that is selected from the group consisting of an available occupancy of the venue, a historical attendance of the users of the units of the mobile programmable device at similar events within similar venues, and a relation of a time of the event to a time period known to have an impact on event attendance relative to other times;
   predict data usage of the units of the mobile programmable device of the predicted attendance as a function of historic data usage relevant to the predicted attendance, historic data usage relevant to the venue for the event, and of the determined real-time level of social media following activity associated with said event;
   predict a bandwidth requirement for usage of a first WiFi pathway of the designated WiFi node for a plurality of requests by the units of the mobile programmable device as a function of the predicted attendance, of the predicted data usage of the units of the mobile programmable device of the predicted attendance, and of projected data sizes of the requests; and
   dynamically adjust bandwidth of the first WiFi pathway as a function of the predicted bandwidth requirement.

12. The computer program product of claim 11, wherein the venue spans a geographic space that is larger than the communication range of the designated WiFi service node, and the designated WiFi service node is one of a plurality of WiFi service nodes that are deployed within the venue geographic space and spaced to provide non-overlapping communication ranges that in aggregate provide comprehensive WiFi coverage of the venue; and
   wherein the computer readable program code instructions, when executed by the computer processor, further cause the computer processor to dynamically deploy, to meet a real-time determination of an increase in demand for bandwidth for the first WiFi pathway above the predicted bandwidth requirement for usage of the first WiFi pathway of the WiFi node for the plurality of the requests by the units of the mobile programmable device as a function of the predicted attendance and as a function of the determined real-time level of social media following activity associated with said event, an additional item that is selected from the group consisting of an additional first WiFi pathway by the WiFi node providing the first WiFi pathway, and an additional WiFi node.

13. The computer program product of claim 12, wherein the computer readable program code instructions, when executed by the computer processor, further cause the computer processor to determine the real-time determination of the increase in demand for the bandwidth for the first WiFi pathway above the predicted bandwidth requirement for usage of the first WiFi pathway of the designated WiFi node as a function of a projected percentage of favored requests relative to all requests passed by designated WiFi node, and the projected data sizes of the favored requests.

14. The computer program product of claim 12, wherein the computer readable program code instructions, when executed by the computer processor, further cause the computer processor to determine the relation of the time of the event to the time period known to have the impact on event attendance as whether the time of the event is within the time period known to have the impact on event attendance; and
   wherein the time period known to have the impact on event attendance is selected from the group consisting of a business day, a school calendar, and an annual season.

* * * * *